United States Patent [19]
Nabinger

[11] 3,938,820
[45] Feb. 17, 1976

[54] INVALID CART AND LIFT

[76] Inventor: Herman G. Nabinger, 311 Kirk Ave., Syracuse, N.Y. 13205

[22] Filed: Aug. 21, 1974

[21] Appl. No.: 499,313

[52] U.S. Cl. ............ 280/47.11; 200/00 R; 297/339; 297/392; 108/147; 5/86
[51] Int. Cl.² .................. B62B 3/12; A61G 7/10
[58] Field of Search .................. 280/80, 250, 47.11; 297/339, 348, 392, 410; 108/147; 5/81 R, 86

[56] References Cited
UNITED STATES PATENTS

| | | |
|---|---|---|
| 1,700,088 | 1/1929 | Smith .............................. 5/81 R X |
| 2,187,283 | 1/1940 | Scheutz .......................... 297/348 X |
| 2,375,907 | 5/1945 | Farmer ...................... 280/47.11 X |
| 2,439,163 | 4/1948 | Farmer .................................. 5/86 |
| 2,962,730 | 12/1960 | Carnes .................................. 5/86 |
| 3,493,245 | 2/1970 | Nabinger ......................... 280/250 |
| 3,643,996 | 2/1972 | Carnahan ..................... 297/392 X |

*Primary Examiner*—Kenneth H. Betts
*Assistant Examiner*—R. Schrecengost
*Attorney, Agent, or Firm*—Bruns & Jenney

[57] ABSTRACT

An invalid cart and lift, designed primarily for use in hospitals and the like, is comprised of a horizontally disposed frame movable on two back wheels and a front steering wheel. A steering shaft, extending vertically from the front steering wheel, has at its upper end a drop down handle by which this cart it pulled and steered. A housing extending vertically from the frame supports a vertically movable seat. A manual crank operates through a mitre gear and a ball nut-screw combination to raise and lower the seat. A friction brake when engaged holds the seat at a desired level. A sanitary chin and chest rest adjustable to the invalid's height raises and lowers with the seat. A safety belt with a positive lock prevents the invalid from falling from the seat.

8 Claims, 11 Drawing Figures

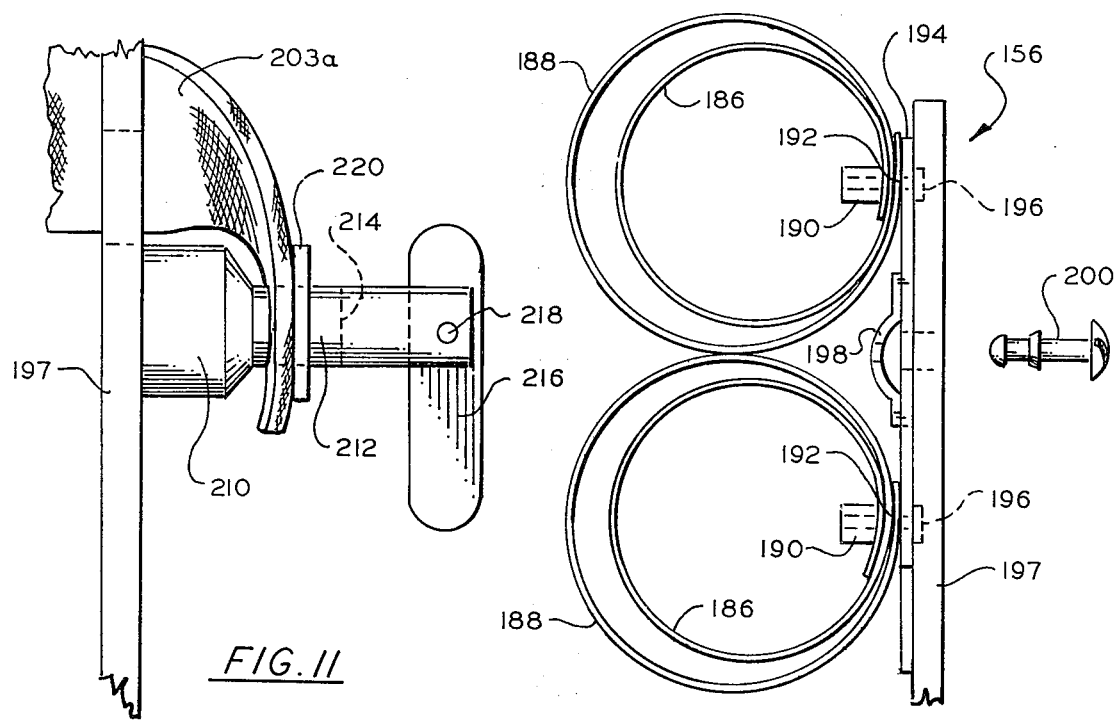
FIG. 11
FIG. 9
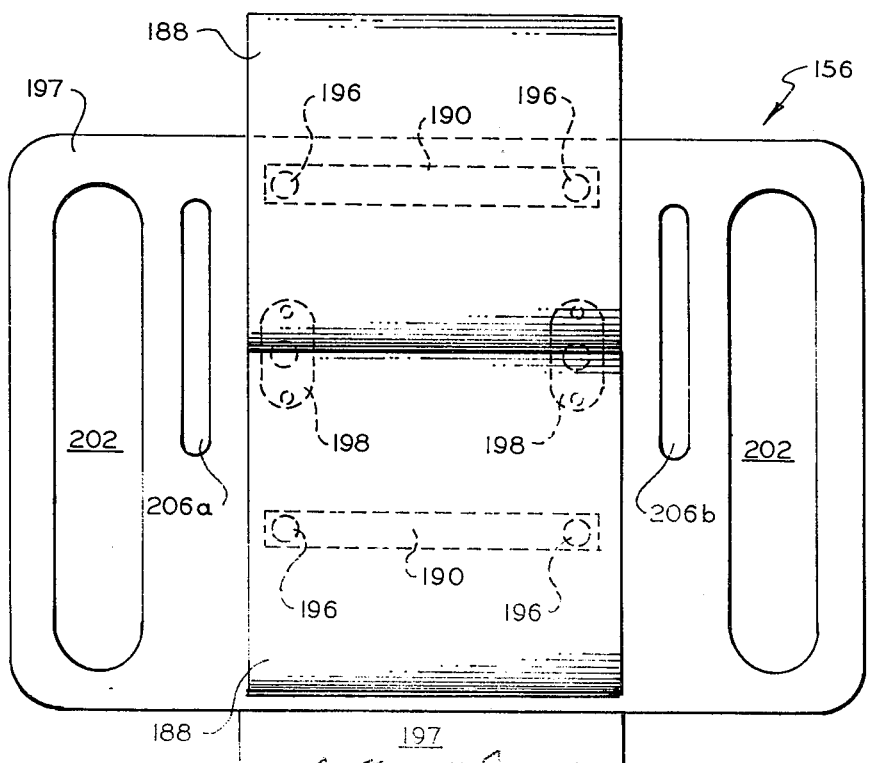
FIG. 10

INVALID CART AND LIFT

BACKGROUND OF THE INVENTION

This invention relates to an invalid cart and lift, and more particularly to an improved invalid cart and lift that is particularly adapted for hospital use.

Present invalid carts and lifts, as disclosed in U.S. Pat. No. 3,493,245 issued to the present applicant, are designed to give invalids a degree of independence by putting the propelling means under their control. This type of device serves particularly well in a home or the like where limited care is all that is needed and all that is desired.

However, hospitals and nursing homes have found this type of cart and lift to be impractical. Many hospital patients are not physically capable of performing the minimal work needed to operate this device. Moreover, many hospital patients, particularly among the elderly, are temporarily or permanently mentally incapable of being put in control of unlimited self-propelling means. Further, hospitals are generally complex facilities where, to avoid confusion, patients in transit are accompanied by an attendant. A cart having self-propelling features is thus not needed and not wanted. What is needed is a cart and lift under the complete control of the attendant. Experience with the prior art carts has also shown that the chin rest must be continuously sterilized. A chin rest lending itself to rapid sterilization would be a very desirable feature.

SUMMARY OF THE INVENTION

An invalid cart and lift designed primarily for use in hospitals and the like is comprised of a horizontally disposed frame having a closed end and an end with an opening therein. The frame is movable on two rear wheels rotatably connected to the sides of the opening and on a front steering wheel rotatably connected to the closed end of the frame. Two stabilizing wheels straddle the front steering wheel. A steering shaft, extending vertically from the front steering wheel, has at its upper end a drop down handle by which the cart is pulled and steered.

A housing extending vertically from the frame supports a vertically movable seat. A manually operated crank actuates a drive shaft which acts through a mitre gear to drive a ball screw and nut combination. The ball nut being integral with the seat results in the seat moving up or down as the crank is rotated. A friction brake when engaged holds the seat at the desired height.

A sanitary chin and chest rest, adjustable to the invalid's height raises and lowers with the seat. The chin rest is easily removed from the cart for sterilization. The design of the chin rest permits a thorough, rapid cleaning. A safety belt with a positive lock prevents the invalid loosening the belt and falling from the seat. Straps are provided so that if need by the invalid's legs can be secured to the cart.

BRIEF DESCRIPTION OF THE DRAWINGS

FIG. 9 is an enlarged side elevation of the chin and chest rest means;

FIG. 10 is an enlarged left end view of the chin and chest rest means; and

FIG. 11 is an enlarged side elevation of the safety belt positive lock means.

DESCRIPTION OF THE PREFERRED EMBODIMENTS

Figure 1:
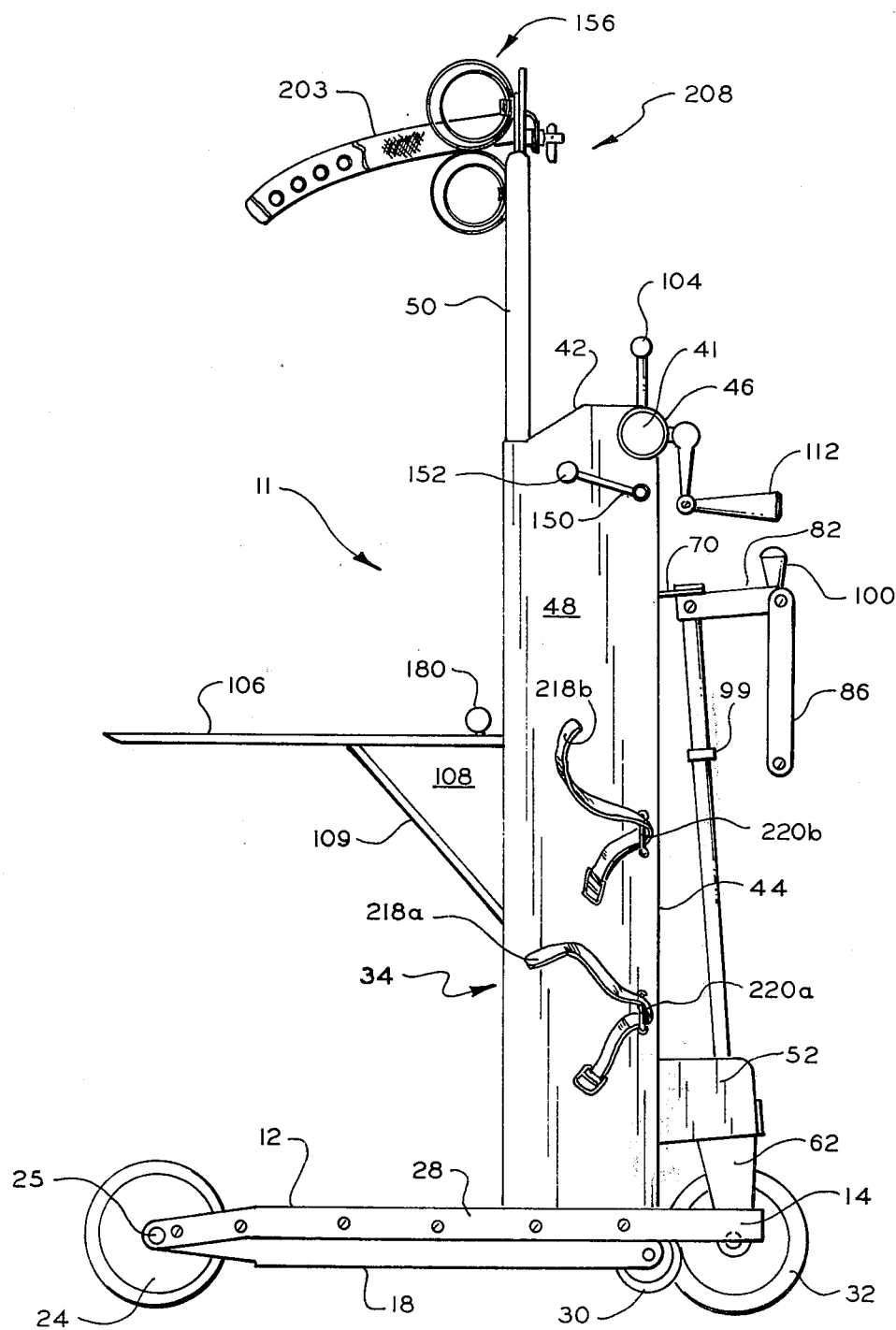
FIG. 1 is a side elevation of the invalid cart and lift embodying the invention.
Figure 2:
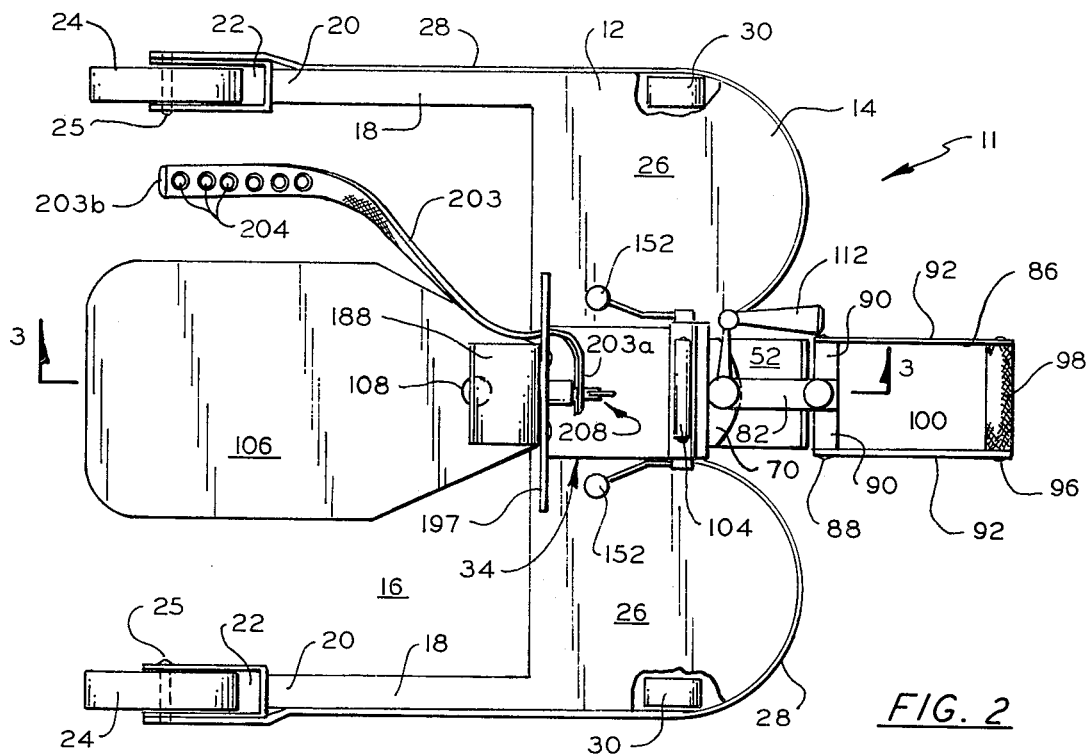
FIG. 2 is a top plan view of the invalid cart and lift with parts of the platform broken away to show the stabilizing wheels.

Referring now to FIGS. 1 and 2, the improved cart and lift 11 of this invention, hereinafter referred to as the cart, is comprised of a conventional horizontally disposed frame 12 having a closed end 14 and an end with an opening 16 therein, the opening 16 having a portion of the frame 12 as its opposing side walls 18. At the outer end 20 of each side wall 18 is a slot 22 in which a rear caster 24 is retained by an axle 25. Conventionally, opening 16 receives a wheel chair, a toilet, etc. for transferring an invalid thereto or therefrom.

The closed end 14 of the frame forms a platform surface 26. Although other shapes are workable, the B shaped platform of the preferred embodiment provides a support surface for the invalid's feet while keeping the platform's surface area and thus the cost and weight of the platform to a minimum. A rubber bumper 28 on the outside of the vertical surfaces of the frame protect furniture and the like from being scarred should the cart accidentally bump into same.

Two spaced, parallel stabilizing wheels 30, seen in the broken away portion of FIG. 2, straddle a third wheel 32 (to be described). Normally raised approximately one half inch off the floor these wheels prevent the cart 11 from overturning due to an uneven distribution of load.

Figure 5:
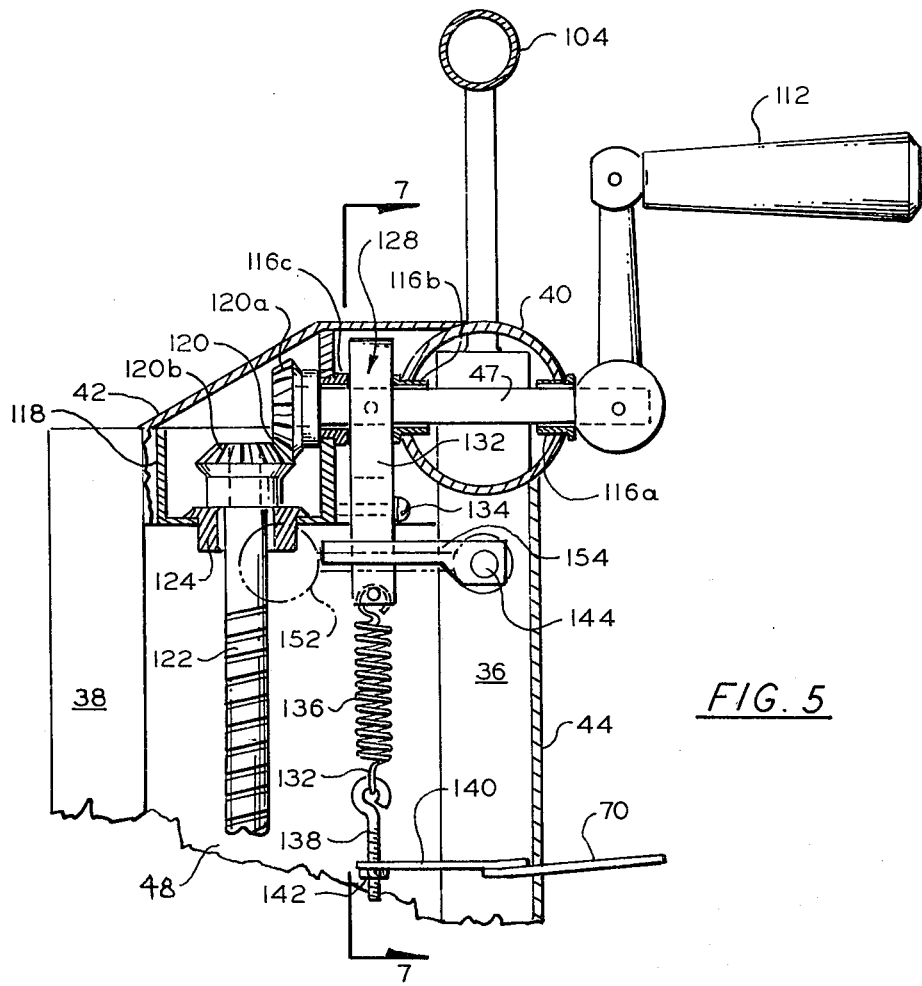
FIG. 5 is an enlarged vertical section through the means for raising and lowering the seat.

A housing 34 extends vertically from and is connected to the closed end 14 of the frame 12. The housing, a rectangular box-like structure, includes two front and two rear corner posts 36, 38, FIG. 3. A cylindrical support member 40 (as best seen in FIG. 5) has corresponding apertures in its upper and lower surfaces through which the upper parts of the front corner posts 36 pass. Caps 41, FIG. 1, close the open ends of the cylinder.

Figure 3:
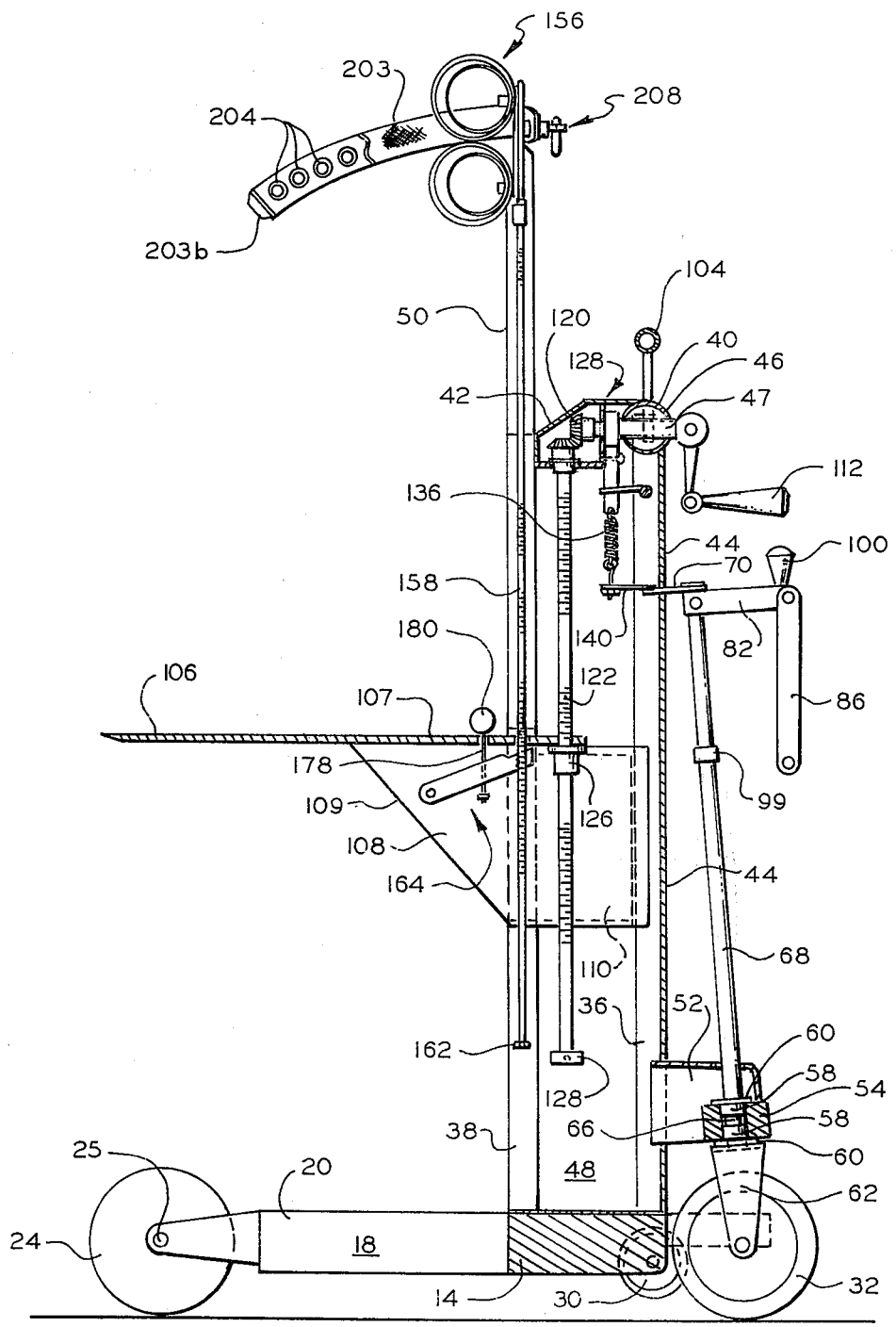
FIG. 3 is a longitudinal section taken on line 3—3 of FIG. 2.

A top panel 42, FIG. 3, spanning the gap between the four corner posts 36, 38 is welded to the cylindrical support 40. A front panel 44 spanning the gap between the front corner posts 36 is also welded to the cylindrical support. In this manner, a portion of the surface of the cylindrical support becomes the front edge 46 of the cart 11 making the front edge rounded and thus safer for the invalid. The cylindrical support 40 additionally provides support for horizontal shaft 47 to be described.

Side panels 48, FIG. 1, extend between successive front and rear corner posts 36, 38. The rear corner posts 38, FIG. 3, are hollow to slidably receive chin rest supports 50 to be described.

A support housing 52, FIG. 3, extending forwardly of front panel 44 forms a guard and support for a bearing housing 54 secured therein. A bore through the bearing housing contains upper and lower ball bearings 58 retained in flanged cages 60. An inverted U shaped steering wheel support 62, having steering wheel 32 mounted therein, has a post 66 extending upwards therefrom through bearings 58. A steering shaft 68 is telescopically fit on the aforesaid post 66 and extends upwardly therefrom.

Figure 4:
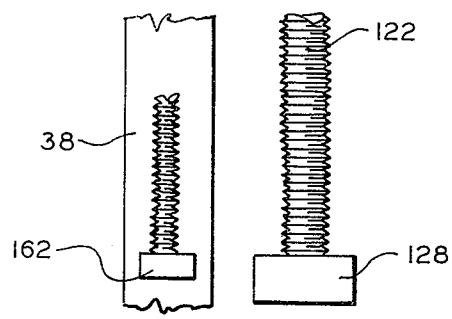
FIG. 4 is an enlarged side elevation of the drop-down pulling and steering handle.
Figure 4:
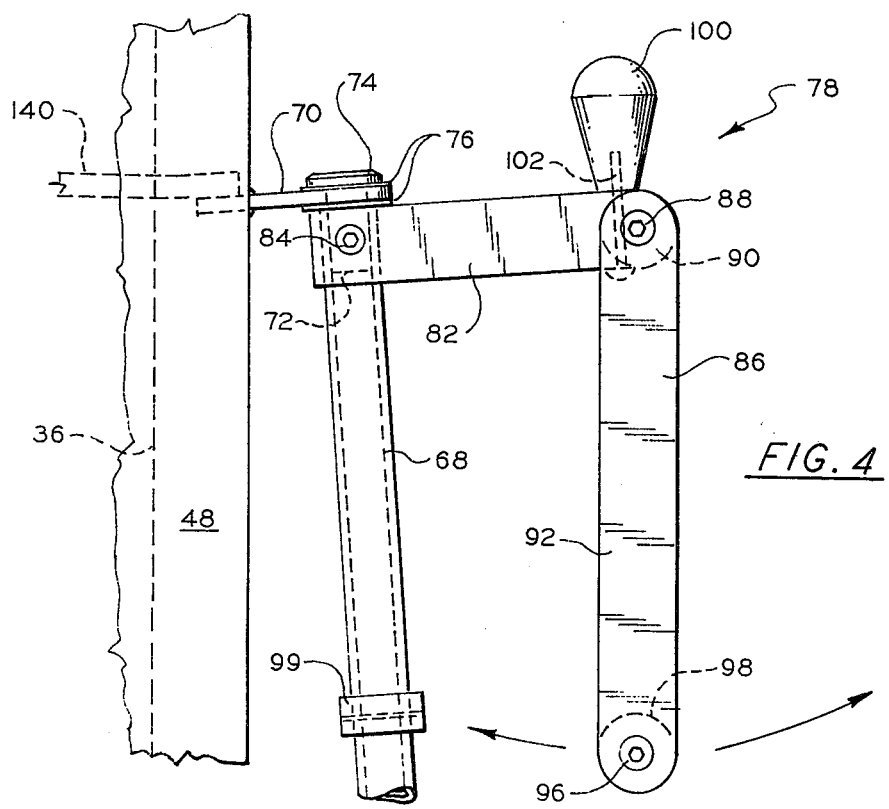

A steering plate 70, FIGS. 2, 3 and 4, is anchored in the upper portion of the front panel 44 and extends outwardly therefrom. A support post 72, FIG. 4, having a flanged top extends downwardly through an aperture in the steering plate 70 and is telescopically received in the upper end of the steering shaft 68. Bushings 76 encircle the support post on either side of the steering plate 70.

A pulling handle assembly 78 is connected to the upper portion of the steering shaft 68. While any appropriate pulling means with the ability to rotate steering shaft 68 is workable, the preferred handle is long enough so that the cart 11 will not strike the heels of the person doing the pulling but does not protrude when not in use. One way these features are achieved is with a hinged handle comprised of an anchor bar 82, fixed by bolt 84 to the upper portion of the steering shaft 68, and extending perpendicularly from the shaft a distance short of the foremost point of the steering wheel 32, see FIG. 1. A rectangular drop down handle 86 is secured by hinge means to the outer end of the anchor bar 82. The handle and hinge means (as best seen in FIG. 2) are comprised of a bolt 88 passing horizontally through an aperture in the anchor bar 82 with spacer bushings 90 on either side of the anchor bar. Pull bars 92 extend perpendicularly from the spacer bushings 90 and have their outer ends joined by a bolt 96 passed through a knurled hand grip 98.

The above described handle 86 will be rotated downwardly by gravity to the position shown in FIGS. 1 and 4 when the handle is not in use. A plastic bumper 99 protects steering shaft 68 from being marred by the downwardly rotating handle 86. With the handle in the lowered position the foremost point on the cart 11 is the cart's steering wheel 32. Therefore if the cart accidentally strikes a wall or the like there is no protruding handle to cause damage. When the cart 11 is to be pulled the handle 86 is rotated upwards to the position seen in FIG. 2.

A second steering handle 100, FIG. 4, projects upwardly from the anchor bar 82 and is held in place by screw 102. This handle is used to steer the cart while backing up and maneuvering. A handle 104, FIGS. 1 and 3, extending upwardly from cylindrical support 40 has an inverted U shape. This handle is used to push the cart while backing up and maneuvering.

A horizontally disposed seat 106, FIG. 3, has its front end 107 secured to the top of a triangularly shaped support structure 108. The support structure is either made from a composition material or is provided with a composition covering on its angularly disposed surfaces 109 in order to prevent accidental damage to a wheelchair, toilet, etc. during transfer.

The triangular support structure 108 passes between rear corner posts 38 to connect to bearing blocks 110. Successive front and rear corner posts 36, 38 form guideways in which these blocks 110 slide. As the seat 106 moves vertically (in a manner described hereinafter) the blocks 110 coact with the corner posts to withstand the rotational component of force on the seat. To ensure that the corner posts will not be forced apart by this rotational force the side panels 48 can be constructed with their edges bent around the aforesaid successive posts 36, 38.

Figure 6:
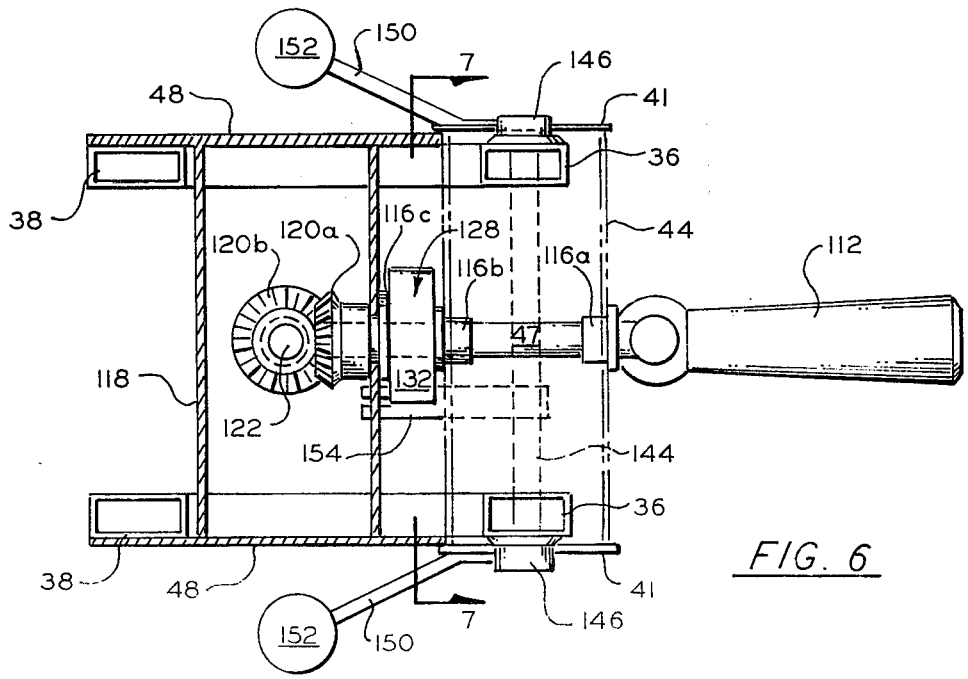
FIG. 6 is a horizontal section through the means for raising and lowering the seat.

As best seen in FIGS. 5 and 6, a crank handle 112 extends from the front of the cart 11. Being on the front, the crank is both easily accessible to the attendant and non-accessible to the invalid. Crank handle 112 is secured by appropriate means to the extending end of horizontal drive shaft 47. The horizontal shaft is rotatably supported by bearings 116a, b and c, with bearings 116a and b mounted in aligned apertures in cylindrical member 40 and bearing 116c mounted in an aperture in a gear support housing 118 (to be described).

Mitre gear 120 formed by bevel gears 120a, b, transfers horizontal rotation to vertical rotation. Bevel gear 120b and the driven vertical shaft 122 affixed thereto are supported by a flanged bearing 124.

Gear support housing 118 holding bearings 116c and 124 is formed of a plate having a U shape in cross section, as seen in FIG. 5. The two upper edges of the plate are welded to the top panel 42 while the ends of the plate are welded to the side panels 48.

Figure 8:
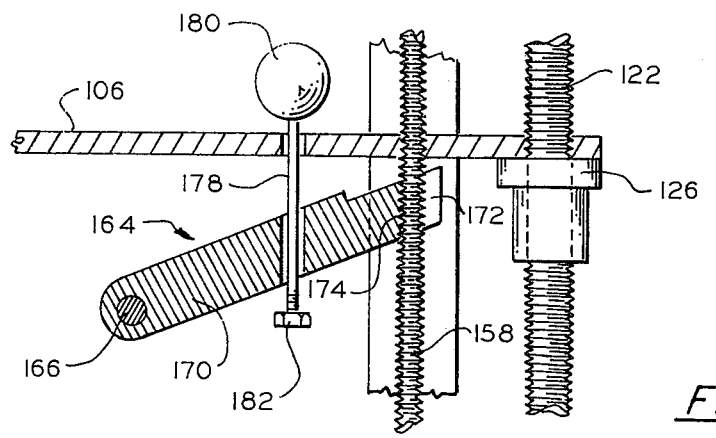
FIG. 8 is an enlarged vertical section through the chin and chest rest lock means.

Vertical shaft 122, FIGS. 3 and 8, passes through an aperture in seat 106 and through ball nut 126 welded to the underside of the seat. Shaft 122 is threaded to form a ball screw to act in conjunction with ball nut 126. Block 128 fixed on the lower end of the vertical shaft acts as a stop to limit the downward movement of the seat 106.

As crank handle 112 is manually turned, FIGS. 3, 5 and 6, horizontal shaft 47 rotates. The rotating horizontal shaft 47 acts through mitre gear 120 to rotate vertical shaft 122. As vertical shaft 122 rotates, ball nut 126 acts conventionally to move seat 106 vertically up or down.

Because a ball screw and ball nut combination is used, the frictional resistance to raising the seat is minimal. With low friction levels, the weight of an invalid on the seat will cause the seat to move vertically downward. In the preferred embodiment a friction brake 128 operates to supply frictional resistance to prevent the seat from lowering inadvertently while not adding significantly to the frictional resistance to raising the seat.

Figure 7:
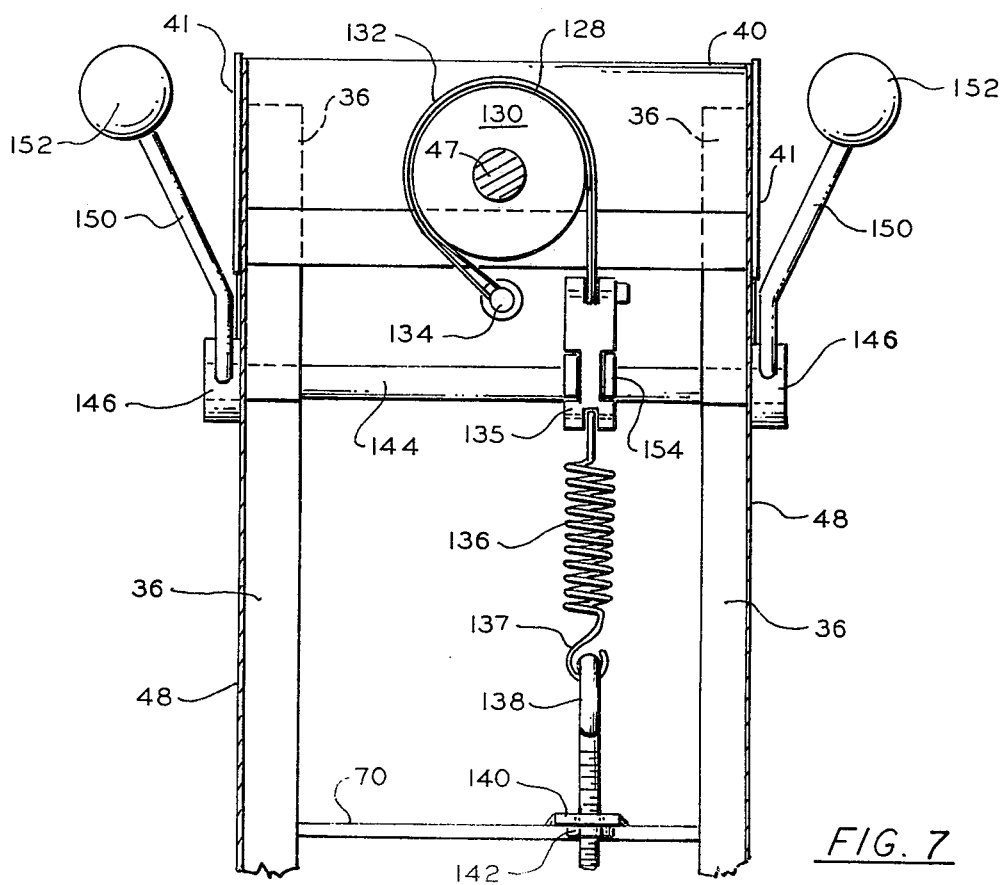
FIG. 7 is a transverse cross section of the braking means taken on line 7—7 of FIG. 5.

This friction brake 128, best seen in FIGS. 5 and 7, includes a friction disc 130 secured to and rotatable with horizontal shaft 47. A friction band 132 is anchored at one end by stationary means 134, here a screw fixed to housing 118. The friction band is then wrapped over the friction disc 130 in the direction of rotation of shaft 47 which causes seat 106 to descend, here clockwise as seen in FIG. 7. The friction band 132 is biased into engagement with the friction disc 130 through an I-shaped actuator block 135 on an extension spring 136. The extension spring has a hooked end 137 which is anchored to eyebolt 138. The eyebolt in turn passes through an anchor strip 140, FIGS. 3, 5 and 7, and is secured thereto by bolt 142. The anchor strip is welded to that part of the steering plate 70 that extends through front panel 44, FIG. 5.

As seen in FIGS. 6 and 7, a shaft 144 has ends 146 extending through apertures in front corner posts 36. Shaft ends 146 have the inner ends of handles 150 received therein. The outer ends of these handles are capped by spherical knobs 152. Secured to shaft 144 between the corner posts is an actuator arm 154. The actuator arm extends perpendicularly to shaft 144, its extended end being forked to receive the recessed portion of the I-shaped actuator block 135.

Extension spring 136 biases the friction band 132 into binding engagement with friction disc 130 to thereby prevent rotation of shaft 47 and shaft 122. Bolt 142 can be adjusted to increase the tension on this spring.

To relieve the tension caused by spring 136, knobs 152 are lifted vertically, FIGS. 5 and 7. This upward movement is transmitted by handles 150 to shaft 144 and thus actuator block 134. As the actuator block is forced upward it extends spring 136, removing its biasing pull on friction band 132 and lifts the friction band from engagement with friction disc 130. With friction disc 130 free to rotate shafts 47 and 122 are free to rotate permitting the seat 106 to move downwardly. To stop the downward progression of seat 106 knobs 152 are pushed downwardly. This downward force is transmitted by the handles 150 to shaft 144 and the actuator block 134. As the block moves downward it pulls friction band 132 into binding engagement with friction disc 130.

When the seat is being raised, shaft 47 and the friction disc 130 are rotated counterclockwise (FIG. 7). The friction between friction disc 130 and friction band 132 will cause the friction band to tend to rotate with the disc. As the band tends to rotate it will pull against extension spring 136 and thus counteract a portion of its biasing pull. With the biasing pull released, the friction disc 130 will be able to rotate relative to the friction band 132. In this manner the friction brake will not impede upward movement of seat 106.

Chin and chest rest means include a chin and chest rest unit 156, FIGS. 9 and 10, and is supported by threaded shaft 158. This unit is given stability by the aforementioned chin rest supports 50, FIG. 3. As seen in FIGS. 3 and 8, threaded shaft 158 extends downwardly from the chin rest unit 158 through an aperture in seat 106 and terminates in stop block 162.

A releasable chin rest lock 164 is comprised of a pin 166 spanning the gap between the triangular seat supports 108. A bar 170 pivoting on pin 166 has a forked end 172. The forked end 172 of the bar straddles threaded shaft 158. In the crotch of the fork are teeth 174 dimensioned to mate with the threads of the shaft. A lock releasing means consists of a shaft 178 having knob 180 at one end, the shaft 178 passing through an aperture in the seat 106 and being connected to bar 170 by nut 182.

When the teeth 174 of bar 170 are in engagement with threaded shaft 158, the chin rest unit will move vertically with the vertically moving seat 106. To adjust the height of the chin rest unit relative to the height of the seat to accommodate invalids of varying heights, knob 180 is pulled upwardly causing bar 170 to pivot and disengage teeth 174 from shaft 158. Shaft 158 and thus chin rest unit 156 are now free to be moved vertically independent of seat 106. When the chin rest unit 156 is positioned as desired, knob 180 is released. Gravity pulls bar 170 and thus teeth 174 back into engagement with threaded shaft 158.

Chin and chest rest unit 156, FIGS. 9 and 10, is comprised of two continuous strips of plastic material, such as low density polyethylene, each strip rolled so as to form a small cylinder 186 within a larger cylinder 188. A rectangular bar 190 is bolted at the junction 192 of each set of cylinders to a chin rest plate 194 by means of two bolts 196. The four protruding bolt heads are received in corresponding recesses in a plate 197, thereby aligning the two plates 194, 197, see FIG. 10, Quick connecting screws such as conventional Lion connectors, formed by receptacles 198 and screws 200 are used to secure the chin and chest rest means to plate 197. Plate 197, connected to chin rest supports 50, has two vertical sides with apertures 202 running parallel and proximate each vertical side, the apertures being dimensioned to receive the fingers of a hand, enabling an invalid to grip the plate 197 for support. Chin rest plate 194 is attached to plate 197 between these two apertures 202.

The novel design of this chin and chest rest unit allows it to be easily removed from the cart whereupon the unit can be submerged in antiseptic for sterilization and then rapidly reattached to the cart. This is particularly necessary as invalids are frequently incapacitated to the point where they will salivate excessively. The use of a smaller cylinder within a larger cylinder provides the necessary strength and flexibility for the unit while permitting the antiseptic to completely penetrate it.

While the preferred embodiment contains a continuous strip of plastic rolled to form two cylinders it is obvious that two separate cylinders can perform the same function. Also while two sets of cylinders are used, the lower set is not strictly necessary as it is primarily for supporting the invalid's chest. A chin rest only unit may include only one set of cylinders.

A safety belt 203, FIGS. 2 and 3, made of cotton webbing has spaced apertures 204 therein. One end of the belt 203a passes through a slot 206a, FIG. 10, in the plate 197. The other end of the belt 203b is wrapped around an invalid being transported by the cart 10 and then passed through a slot 206b in plate 197. Both ends are held by safety belt lock means 208.

The lock means 208, FIG. 11, includes a lock shaft 210 extending horizontally from plate 197, the lock shaft having a reduced diameter portion 212 with a slot 214 in its outer end. The diameter of this reduced portion is dimensioned to be received in the apertures 204 in belt 203.

A lever 216 has one end held in the slot of lock shaft 210 by a roll pin 218 whereby the lever 216 can rotate from the horizontal, FIG. 2, to the vertical, FIG. 11. An aperture in belt end 203a is slipped over the reduced diameter portion 212 and is held thereon by a washer 220. Washer 220 can be slid off to remove safety belt 203 for washing.

After the belt end 203b has been passed through slot 206b in plate 197, an aperture 204 in the belt is slipped over lever 216 and onto reduced diameter portion 212. The lever is then allowed to drop perpendicularly to the lock shaft to form a stop and thereby hold the safety belt from inadvertent disconnection.

The safety belt 203 will hold an invalid upright even while unconscious. Other retaining means in carts presently available will allow an unconscious person to slip off the cart. The positive lock 208 requires a conscious effort to release it. This will prevent an invalid from inadvertently releasing the belt 203.

Straps 218a and b, FIG. 1, are used to secure the invalids' legs to strap loops 220a and b. An invalid occasionally will not have complete control over his extremities and in this situation his legs are strapped to strap loop 220a. If an invalid is unable to bend his knee (i.e. cast on leg) his leg is strapped to strap loop 220b.

From the foregoing description it will be apparent the invention disclosed herein provides a novel and highly useful invalid cart and lift. As will be understood by those familiar with the art, the invention may be embodied in other specific forms without departing from the spirit or essential characteristics thereof.

I claim:

1. An improved invalid cart and lift comprising:
   a horizontally disposed frame having a closed end and an end with an opening therein, the opening having a portion of the frame as its opposing side walls;
   a support wheel rotatably connected to each of the opposing side walls of the opening;
   a horizontally disposed platform integral with the closed end of the frame;
   a steering wheel supporting the closed end of the frame;
   a steering shaft operably connected to the steering wheel and extending upwardly therefrom;
   a handle for pulling and steering the cart connected to the upwardly extending portion of the steering shaft, with the handle, the steering shaft and the steering wheel being operably connected so that horizontal movement of the handle results in a corresponding movement of the plane of rotation of the steering wheel;
   a housing projecting vertically from the frame;
   a seat supported by the housing, the seat being vertically movable for raising and lowering a patient by means including a manually operated crank extending from the housing, a horizontal drive shaft actuated by the crank, a vertical threaded driven shaft, a mitre gear for transmitting the rotation of the drive shaft to the driven shaft, with the mitre gear, the drive and the driven shafts being for the most part contained in the housing, and a ball nut forming a part of the seat, the ball nut being operably connected to the vertical threaded driven shaft whereby rotation of said shaft effects vertical movement of the ball nut and therefore the seat; and
   braking means to slow or totally stop the downward vertical movement of the seat, the braking means including a disc operably connected to rotate with one of said drive and driven shafts, a band having two ends with one end anchored securely, the band being wrapped over a portion of the disc, spring means, operably connected to the other end of the band, biasing the band into frictional engagement with the disc, and brake release means which when actuated relieve the biasing effect of the spring means.

2. The improved invalid cart and lift of claim 1 wherein the seat has an aperture therethrough and wherein the cart and lift includes a chin rest means comprised of:
   a support shaft passing through the aperture in the seat and extending vertically upwardly and downwardly therefrom;
   releasable lock means operable to connect the support shaft to the seat whereby the support shaft will move vertically with the vertical movement of the seat; and
   a chin rest unit operably connected to the upwardly extending portion of the support shaft.

3. The improved invalid cart and lift of claim 2 wherein the chin rest unit is comprised of:
   a rigid plate having two vertical sides with an aperture running parallel to and proximate each vertical side, the apertures being dimensioned to receive the fingers of a hand enabling an invalid to grip the plate for support; and
   a continuous strip of flexible material rolled so as to form a larger cylinder surrounding a smaller cylinder, the cylinders being operably connected to the plate between the apertures.

4. The improved invalid cart and lift of claim 2 wherein the lock means includes:
   threads on the support shaft;
   a forked bar;
   a pin operably connected to the underside of the seat and forming a pivot for the forked bar, teeth in the crotch of the forked bar dimensioned to mesh with the threads of the support shaft, the teeth being held against the threads by gravity; and
   release means for pivoting the bar on the pin to move the teeth out of engagement with the threads of the support shaft.

5. The improved invalid cart and lift of claim 2 including:
   a safety belt having spaced apertures therein, the belt being fixed at one point to the chin rest unit;
   a safety belt lock including a lock shaft connected to and extending horizontally from the chin rest unit, the lock shaft having a slot in its extended end and being dimensioned to be received in the safety belt apertures;
   a lever with one end dimensioned to be received in the slot in the lock shaft; and
   a roll pin passing through both the lock shaft and the lever whereby the lever can be rotated to form a stop perpendicular to the lock shaft and thereby hold the safety belt on the lock shaft.

6. The improved invalid cart and lift of claim 1 wherein the handle includes a hinge to permit a part of the handle to rotate to the vertical when not in use.

7. An improved invalid cart and lift comprising:
   a horizontally disposed frame having a closed end and an end with an opening therein, the opening having a portion of the frame as its opposing side walls;
   a support wheel rotatably connected to each of the opposing side walls of the opening;
   a horizontally disposed platform connected to the frame at its closed end;
   a steering wheel supporting the closed end of the cart and lift;
   a steering shaft operably connected to the steering wheel and extending upwardly therefrom;
   a handle for pulling and steering the cart and lift, the handle being connected to the upwardly extending portion of the steering shaft and extending horizontally therefrom, the handle, steering shaft and steering wheel being operably connected so that horizontal movement of the handle causes a horizontal movement of the plane of rotation of the steering wheel;
   a housing projecting vertically from the frame;
   a seat supported by said housing;
   means to move the seat vertically; and
   brake means to slow or stop the downward vertical movement of the seat including a disc operably connected to rotate with one of said drive and driven shafts, a band having two ends with one end anchored securely, the band being wrapped over a portion of the disc, spring means, operably connected to the other end of the band, biasing the band into frictional engagement with the disc, and brake release means which when actuated relieve the biasing effect of the spring means; and a chin rest unit movable vertically with the seat, the unit being adjustable in the vertical direction independent of the seat.

8. The improved invalid cart and lift of claim 7 including:

a backup handle extending upwardly from the housing; and straps connected to the cart housing for securing the invalid's legs thereto.

* * * * *